(12) United States Patent
Grayson et al.

(10) Patent No.: US 9,769,784 B2
(45) Date of Patent: Sep. 19, 2017

(54) SERVING GATEWAY-BASED PRESENCE/LOCATION DETECTION

(71) Applicant: Cisco Technology, Inc., San Jose, CA (US)

(72) Inventors: Mark Grayson, Maidenhead (GB); Eric Hamel, Paris (FR); David Lake, Santa Clara, CA (US); Anton Okmyanskiy, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 14/830,132

(22) Filed: Aug. 19, 2015

(65) Prior Publication Data

US 2017/0055238 A1    Feb. 23, 2017

(51) Int. Cl.
*H04W 64/00*    (2009.01)
*H04L 29/12*    (2006.01)
*H04W 68/04*    (2009.01)
*H04W 84/04*    (2009.01)

(52) U.S. Cl.
CPC ......... *H04W 64/00* (2013.01); *H04L 61/6054* (2013.01); *H04W 68/04* (2013.01); *H04L 61/103* (2013.01); *H04W 84/045* (2013.01)

(58) Field of Classification Search
CPC .......................... H04W 84/045; H04W 64/003
USPC ............................ 455/433, 436, 456.1–456.2
See application file for complete search history.

(56) References Cited

U.S. PATENT DOCUMENTS

| 8,180,368 | B2 | 5/2012 | Anderson et al. | |
| 8,208,431 | B2 | 6/2012 | O'Neil et al. | |
| 8,219,094 | B2 | 7/2012 | Huber et al. | |
| 8,700,055 | B2 | 4/2014 | Lee et al. | |
| 2007/0202851 | A1* | 8/2007 | Hines | H04W 4/02 455/414.1 |
| 2008/0057975 | A1* | 3/2008 | Hines | A63B 53/047 455/456.1 |
| 2008/0313329 | A1* | 12/2008 | Wang | G06Q 10/10 709/224 |
| 2009/0061821 | A1* | 3/2009 | Chen | H04W 60/00 455/411 |
| 2010/0093307 | A1 | 4/2010 | Hui et al. | |
| 2010/0215018 | A1* | 8/2010 | Ejzak | H04W 36/0022 370/331 |

(Continued)

*Primary Examiner* — Dung Hong
(74) *Attorney, Agent, or Firm* — Edell, Shapiro & Finnan, LLC

(57) ABSTRACT

A serving gateway updates location information for a mobile device based on information in an update bearer request. The serving gateway receives a first update bearer request for a mobile device. The first update bearer request includes a first address associated with a micro cellular service base station to which the mobile device is in communication. The micro cellular service base station is associated with a physical location. The serving gateway sends a location notification to a location server, indicating that the mobile device is physically near the micro cellular service base station. The serving gateway receives a second update bearer request for the mobile device including an address associated with a macro cellular service base station. The serving gateway sends another location notification to the location server indicating that the mobile device is no longer at the physical location of the micro cellular service base station.

20 Claims, 6 Drawing Sheets

(56) References Cited

U.S. PATENT DOCUMENTS

| | | | |
|---|---|---|---|
| 2010/0291897 A1* | 11/2010 | Ghai | H04W 12/02 455/410 |
| 2011/0138054 A1* | 6/2011 | Ben-Ezra | H04L 12/5815 709/226 |
| 2011/0171953 A1* | 7/2011 | Faccin | H04W 48/08 455/426.1 |
| 2012/0039214 A1* | 2/2012 | Kim | H04L 12/14 370/254 |
| 2012/0189016 A1* | 7/2012 | Bakker | H04W 76/021 370/401 |
| 2012/0244882 A1* | 9/2012 | Wilson | H04W 64/00 455/456.2 |
| 2013/0130688 A1* | 5/2013 | Chin | H04W 36/22 455/436 |
| 2013/0288736 A1* | 10/2013 | Laumen | H04W 4/08 455/518 |
| 2013/0301610 A1* | 11/2013 | Ali | H04W 36/08 370/331 |
| 2014/0038593 A1* | 2/2014 | Kim | H04W 4/08 455/432.3 |
| 2015/0036657 A1* | 2/2015 | Hong | H04W 36/08 370/331 |
| 2015/0223129 A1* | 8/2015 | Liang | H04W 36/0083 370/331 |

* cited by examiner

SERVING GATEWAY-BASED PRESENCE/LOCATION DETECTION

TECHNICAL FIELD

The present disclosure relates generally to presence/location detection of mobile devices.

BACKGROUND

Micro cellular service base stations are used to extend and/or augment cellular network service in locations that may or may not be adequately covered by macro cellular service base stations. Micro base stations may provide the same cellular data and voice services as the macro base stations (e.g., radio towers), for a smaller, more localized area. The coverage area of micro base stations and macro base stations may overlap, requiring the mobile device to determine which base station provides the best service. As the mobile device moves, it may change the base stations to which it is attached depending on a selection algorithm. The selection algorithm may include hysteresis to prevent rapid switching back and forth between base stations.

Location services allow service providers to customize offerings to users based on their current location. The use of micro base stations with known locations allows the network to provide location information to service providers without any direction from the mobile device of the user. Typically, the Mobility Management Entity is charged with making updates to a presence server that tracks the location information of user devices. The Mobility Management Entity may detect the location a particular mobile device when the device communicates with the micro base station at a particular location. After the mobile device has not communicated with the micro base station for a predetermined amount of time, the Mobility Management Entity may infer that the mobile device is no longer near that location.

DESCRIPTION OF EXAMPLE EMBODIMENTS

Overview

Figure 1:
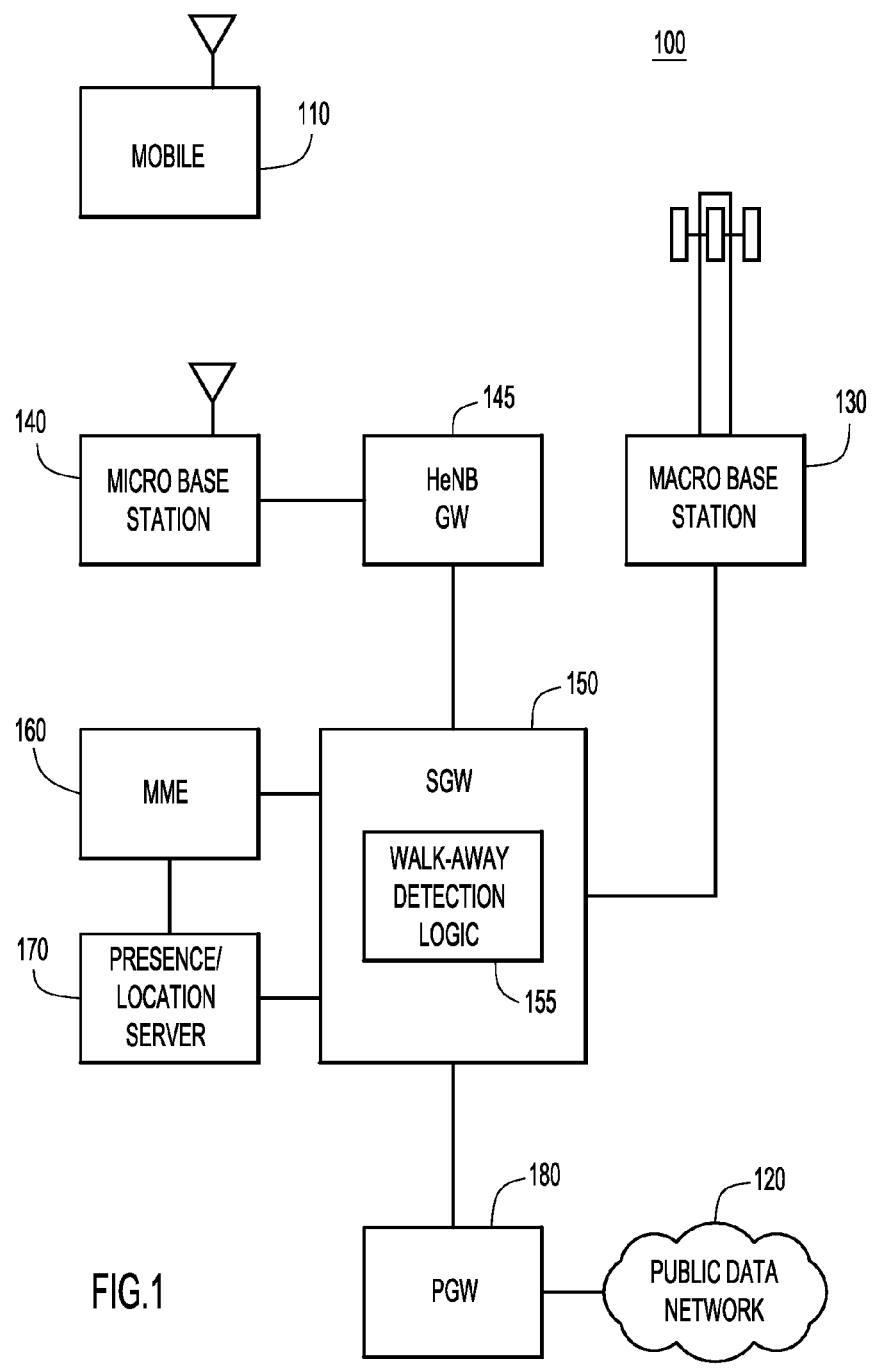
FIG. 1 shows a serving gateway-based location system, according to an example embodiment.

A computer-implemented method is provided for a serving gateway to update location information for a mobile device based on information in an update bearer request. The method comprises receiving a first update bearer request for a mobile device. The first update bearer request includes a first address associated with a micro cellular service base station to which the mobile device is in communication. The micro cellular service base station is associated with a physical location. The method further comprises sending a first location notification to a location server. The first location notification indicates that the mobile device is at the physical location associated with the micro cellular service base station. The serving gateway receives a second update bearer request for the mobile device. The second update bearer request includes a second address associated with a macro cellular service base station. The serving gateway sends a second location notification to the location server. The second location notification indicates that the mobile device is no longer at the physical location associated with the micro cellular service base station.

Example Embodiments

Rather than rely on the expiration of a timer to detect when a mobile device is no longer in the coverage area of a micro base station, the techniques presented herein provide for the serving gateway to determine when the mobile device has moved away from the micro base station. Hereinafter, the capability of the serving gateway to detect when a mobile device has moved away from a micro base station may be referred to as "walk-away detection."

Walk-away detection may be achieved using system elements that have visibility of macro signaling, such as a physical or virtual entity referred to herein as the Mobility Management Entity. However, some service providers may not want to support such vendor proprietary functionality in the Mobility Management Entity. For example, supporting multi-vendor serving gateways may be preferable to multi-vendor Mobility Management Entities. The techniques presented herein provide for micro base station walk-away detection using the serving gateway as an element that has visibility into macro signaling.

A serving gateway is enhanced with functionality for location/presence based on the network address (e.g., Internet Protocol address) of tunnel endpoints. An interface is defined to integrate the serving gateway with a location/presence server. The location/presence server is operable to request to be notified when a specific mobile device (e.g., as identified by an International Mobile Subscriber Identity (IMSI)) is present on the system. The serving gateway may be configured with a set of different network addresses corresponding to micro base stations and/or gateways that aggregate a number of micro base stations. In addition to typical serving gateway functionality, the serving gateway includes the functionality to match mobile identifiers (e.g., IMSI values) signaled by a Mobility Management Entity during standardized signaling (e.g., create default bearer requests) together with the associated network address (e.g., IP address or Tunnel Endpoint Identifier (TEID)), such as in an update bearer request message. For those IMSIs identified as belonging to a watch list from the location/presence server, the serving gateway may match the IP/TEID address with its pre-configured address information and to include such matching information in the presence notification message to the location/presence server.

Using the techniques presented herein, the serving gateway is able to determine when an IMSI previously supported with a tunnel IP/TEID address associated with a micro base station gateway is now supported with a tunnel IP/TEID address not associated with a micro base station, indicating that the mobile device associated with the IMSI has left the coverage of the micro base stations and hence any service adaptation may be immediately updated to reflect the change in location of the mobile device.

In one example, the IMSI selection may be associated with a particular service portal. An enterprise may be interested in the presence of their employee's mobile device and so enters a Mobile Station International Subscriber Directory Number (MSISDN) in a portal, and the MSISDN is converted to an IMSI using well defined application programming interfaces. In another example, a hotel may be interested in a loyalty card member, and will recover the member's MSISDN from their loyalty card database and use a carrier-supplied application programming interface to translate the MSISDN into an IMSI to monitor for their presence.

Referring now to FIG. 1, a simplified block diagram of a system 100 in which a mobile device 110 is configured to access a public data network 120 though a 4G Long Term Evolution (LTE) network infrastructure. The mobile device 110 is also referred to as a User Equipment (UE) in LTE parlance. The network infrastructure includes a macro base station 130 (e.g., a radio tower) to communicate wirelessly and send/receive calls from the mobile device 110. A micro base station 140 may also provide cellular coverage to the mobile device 110 for a relatively smaller area than the coverage area of the macro base station 130. The micro base station 140 may optionally communicate with the rest of the network infrastructure through a Home Evolved Node B Gateway (HeNB GW) 145.

A serving gateway 150 handles communications from both the micro base station 140 (e.g., through the HeNB GW 145) and the macro base station 130. The serving gateway 150 coordinates the call setup and bearers for the calls involving the mobile device 110. Walk-away detection logic 155 in the serving gateway 150 determines when a mobile device 110 is communicating through the macro base station 130 instead of the micro base station 140. A Mobility Management Entity 160 or similar physical device or software process may also coordinate various aspects of the communications sessions for the mobile device 110.

A presence/location server 170 communicates with the serving gateway 150 to coordinate the location or presence of the mobile device 110. The presence/location server 170 may also communicate with the Mobility Management Entity 160. A public network gateway 180 communicates with the serving gateway 150 to generate and maintain the communication links between the mobile device 110 and the public data network 120.

The selection of a serving gateway 150 to support a particular micro base station 140 may be configured in the Mobility Management Entity 160. The configuration of the Mobility Management Entity 160 may be such that specific micro base stations always have their S1-U connections supported by specific serving gateway instances. Hence the system may include a mapping of micro base stations to serving gateways. When selecting a serving gateway to watch for a particular mobile device, the system may re-use this mapping/association. For example, via a portal, an enterprise may identify specific enterprise micro base stations as being of interest. The management system will be responsible for translating this information into a well known micro base station identity. The data used to configure the Mobility Management Entity may then be used to map this micro base station identity to one or more serving gateway instances that are responsible for supporting the S1-U connection for mobile devices attached to these micro base stations.

Figure 2:
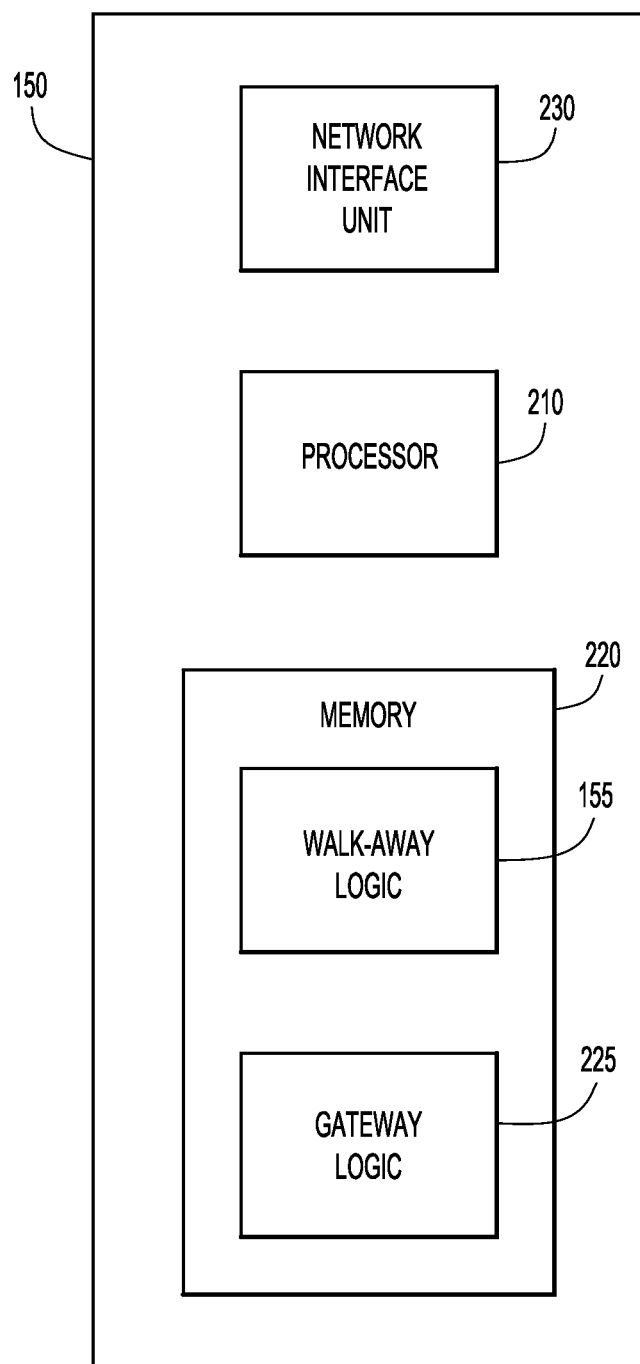
FIG. 2 is a simplified block diagram of a serving gateway to implement to location system, according to an example embodiment.

Referring now to FIG. 2, a simplified block diagram shows an example of a serving gateway 150. The serving gateway 150 includes a processor 210 to process instructions relevant to the operations of the device, and memory 220 to store a variety of data and software instructions (e.g., call data, Policy and Charging Control records, location data, etc.), including walk-away logic 155 and gateway logic 225. The serving gateway 150 also includes a network interface unit 230 configured to communicate with computing devices and network elements over a network. The network may include a wireless network, a wired network, a local area network, a wide area network, and/or other types of networks configured to communicate data between computing devices.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes related to the location detection described herein. Thus, in general, the memory 220 may include one or more tangible (non-transitory) computer readable storage media (e.g., a memory device) encoded with software (e.g., the network path selection logic) comprising computer executable instructions and when the software is executed (by the processor 210) it is operable to perform the operations described herein.

Figure 3:
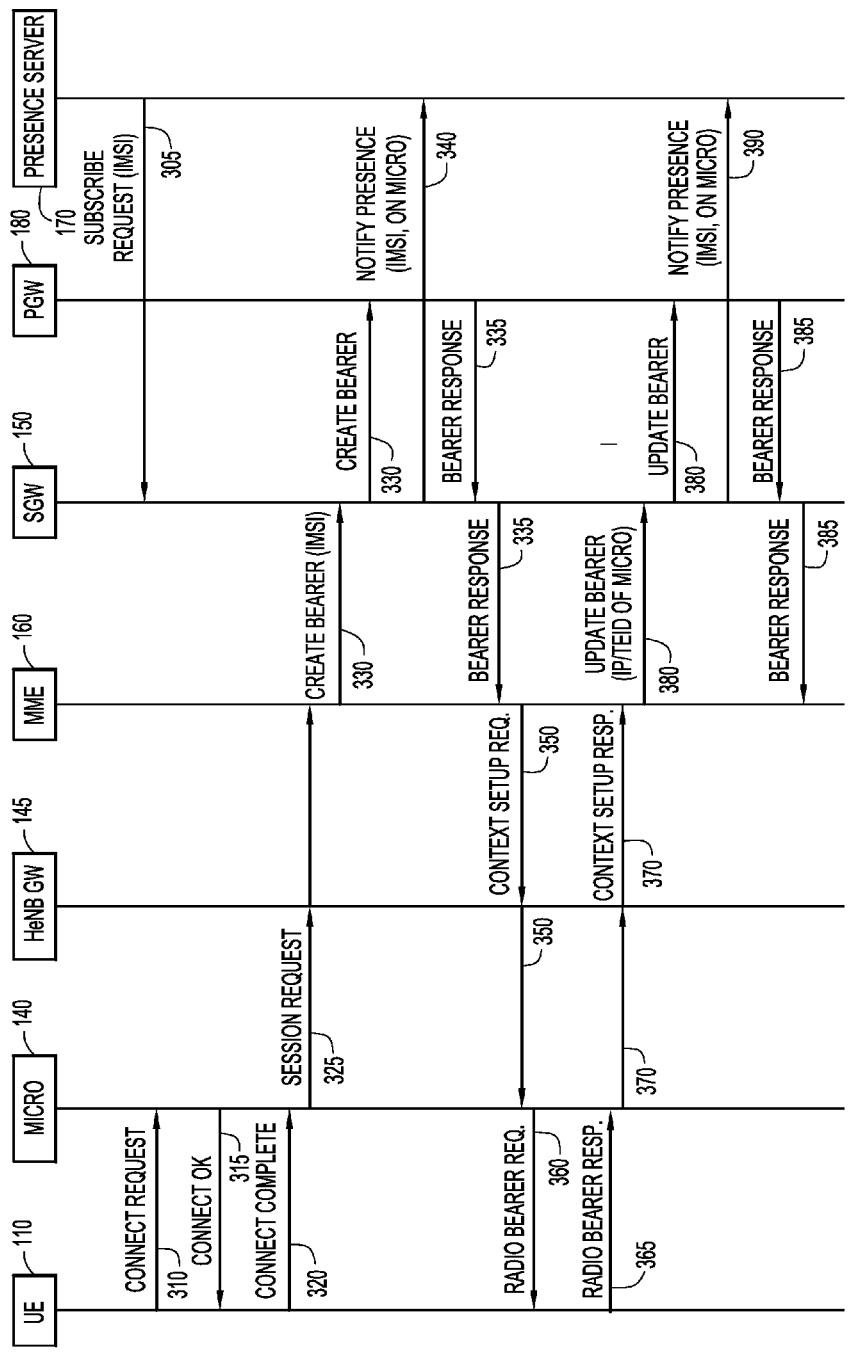
FIG. 3 is a ladder diagram illustrating messages tracking that a mobile device is attached to a micro base station, according to an example embodiment.

Referring now to FIG. 3, a ladder diagram shows messages between elements of the location system in determining the presence of a user equipment device (e.g., mobile device 110) as it first connects to the public network through the micro base station. Since the serving gateway 150 is determining whether the mobile device 110 is near the micro base station (Micro) 140, the presence server 170 sends a subscription message 305 to the serving gateway (SGW) 150. The subscription message 305 includes an identifier for the mobile device 110, such as its International Mobile Subscriber Identity (IMSI).

When the mobile device 110 determines that a micro base station 140 will provide cellular service, it sends a connection request 310 to the micro base station 140. The micro base station 140 replies to the connection request with message 315. The mobile device 110 acknowledges the completed initial connection to the micro base station 140 with message 320. After the mobile device 110 completes the initial connection with the micro base station 140, the micro base station 140 sends a session request message 325 to the Mobility Management Entity (MME) 160, optionally through the gateway (HeNB GW) 145, to connect to the public network gateway (PGW) 180 (e.g., a Public Data Network (PDN) Gateway). The session request message 325 may include an exchange of messages to determine various parameters of the session (e.g., authentication, cipher suites, etc.) that are unaffected by the location system described herein.

As part of the session setup, the Mobility Management Entity 160 sends a create default bearer request message 330 to the serving gateway 150, including the identifier of the mobile device 110. The serving gateway 150 forwards the create default bearer request 330 to the public network gateway 180. The public network gateway 180 responds with a create default bearer response 335 sent to the Mobility Management Entity 160 through the serving gateway 150.

On receiving the create default bearer request 330, the serving gateway 150 may match the mobile identifier in the request 330 to a list of mobile identifiers, e.g., provided in subscription message 305. If the mobile identifier in the create default bearer request 330 is matched to an entry in a list of subscribed mobile identifiers, then the serving gateway 150 may send a presence notification 340 to the presence server 170. The presence notification 340 includes the mobile identifier of the mobile device 110 and an indication that the mobile device 110 is at the location of the micro base station 140.

After the default bearer is created, the Mobility Management Entity 160 sends a context setup request 350 to the micro base station 140. In response, the micro base station 140 sends a radio bearer request 360 to the mobile device 110, which responds with a radio bearer response 365. The micro base station 140 completes the context setup by sending a context setup response message 370 to the Mobility Management Entity 160. The Mobility Management Entity 160 sends an update bearer request 380 to the public network gateway 180 through the serving gateway 150. The public network gateway 180 responds with an update bearer response 385 to the Mobility Management Entity 160 through the serving gateway 150. The update bearer request 380 includes an address of the micro base station 140, such as the Internet Protocol (IP) address or the Tunnel Endpoint Identifier (TEID) of a General Packet Radio Service Tunneling Protocol (GTP) tunnel. In one example, the GTP tunnel may be between the serving gateway 150 and the micro base station 140 or the HeNB gateway 145.

If the update bearer request 380 is for a mobile device 110 that is subscribed to the location service, the serving gateway 150 sends presence notification 390 to the presence server 170 with the mobile identifier of the mobile device 110 and the location information of the micro base station 140. In one example, the serving gateway 150 maintains a list of mobile identifiers that are subscribed to the location service. When a bearer request is received, the mobile identifier form the bearer request is compared to the list of subscribed mobile identifiers, and a match may trigger a presence update to the presence server 170.

In another example, the serving gateway 150 maintains a list of micro base stations, including physical locations and network addresses (e.g., IP address, TEID, etc.) for each of the micro base stations. When a presence update is triggered (e.g., by matching the mobile identifier to a list of subscribed devices), the serving gateway 150 determines the physical location of mobile device 110 by comparing the address in the bearer request to the list of micro base stations/HeNB GWs. If the address matches a micro base station, then the presence update includes the physical location of the micro base station that matches the address.

Figure 4:
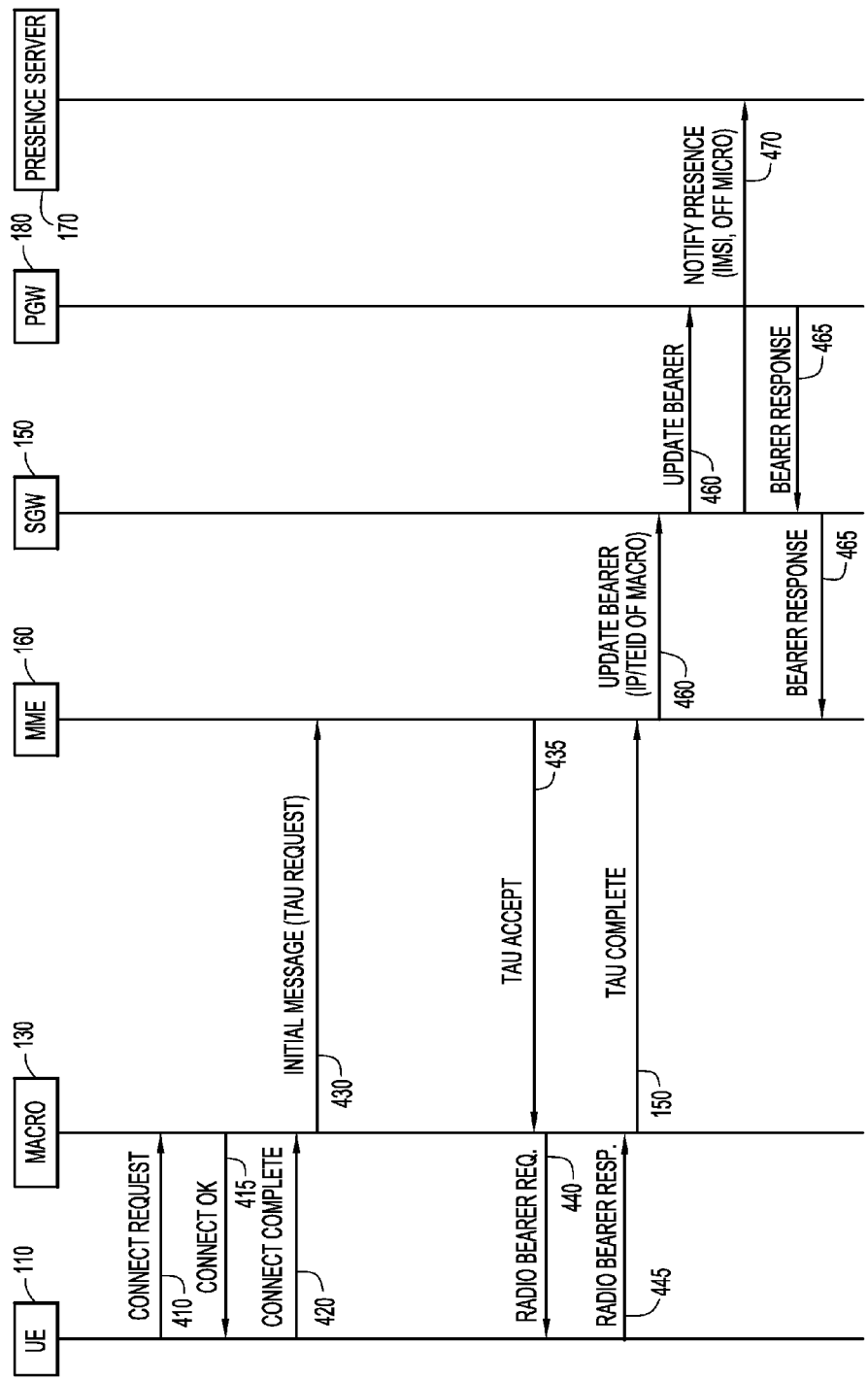
FIG. 4 is a ladder diagram illustrating messages tracking that a mobile device is no longer attached to a micro base station, according to an example embodiment.

Referring now to FIG. 4, a ladder diagram shows messages between elements of the location system in determining the presence of a user equipment device (e.g., mobile device 110) as it leaves the coverage area of the micro base station and attaches to the macro base station. The mobile device 110 sends a connection request 410 to the macro base station 130, which responds with a connection setup OK message 415. The mobile device 110 acknowledges the completion of the connection to the macro base station 130 with message 420. After the connection with the mobile device 110, the macro base station 130 sends an initial message 430 to the Mobility Management Entity 160 including a Tracking Area Update request. The Mobility Management Entity 160 responds with a Tracking Area Update response 435. The macro base station 130 and the Mobility Management Entity 160 may exchange additional messages, such as authentication and/or encryption setup messages, before the Mobility Management Entity 160 accepts the Tracking Area Update request.

After the Mobility Management Entity 160 accepts the Tracking Area Update, the macro base station 130 sends a radio bearer request 440 to the mobile device 110. The mobile device 110 responds with a radio bearer response message 445, allowing the macro base station 130 to complete the Tracking Area Update. The macro base station 130 completes the Tracking Area Update with message 450 to the Mobility Management Entity 160, which triggers an update bearer request 460 to the public network gateway 180 through the serving gateway 150. The serving gateway 150 forwards the update bearer request 460 to the public network gateway 180, which responds with update bearer response 465.

The serving gateway 150 also determines if the mobile device 110 is subscribed to the location service, e.g., by comparing its mobile identifier to a list of subscribed mobile identifiers. If the mobile device 110 is subscribed, then the serving gateway 150 sends a presence notification 470 to the presence server 170 including the mobile identifier of the mobile device 110 and an indication that the mobile device 110 is no longer near a micro base station.

In one example, the update bearer request 460 may be a request to modify the bearer or a request to end the session entirely and release the bearer resources. An update bearer request to end the session may be received at one serving gateway 150 when a different serving gateway is assigned to continue the session (e.g., the mobile device has moved to an area covered by base stations covered by the different serving gateway). In another example, the presence notifications may be sent in response to messages other than the update bearer requests. In general, any message that the serving gateway 150 receives that includes both an identifier of the mobile device 110 and an address of the base station that the mobile device 110 is using to connect to the cellular network may trigger a presence notification.

Figure 5:
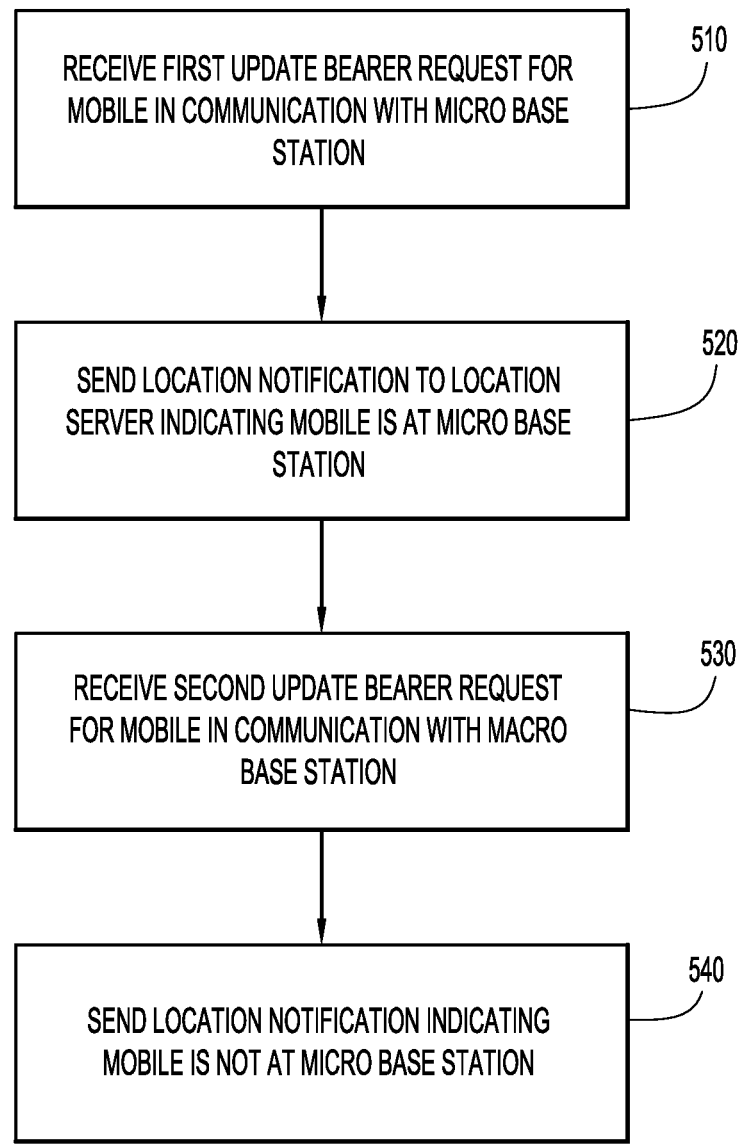
FIG. 5 is a flowchart showing steps taken by the serving gateway in notifying a location server when a mobile device is no longer near a micro base station, according to an example embodiment.

Referring now to FIG. 5, a flowchart is shown of an example process 500 of the operations of the serving gateway 150 in providing timely location notifications. In step 510, the serving gateway 150 receives a first update bearer request for a mobile device in communication with a micro base station. The serving gateway 150 sends a first location notification to a location server in step 520. The first location notification indicates that the mobile device is near the micro base station. In one example, the serving gateway 150 stores a list of network addresses for micro base stations and/or HeNB gateway devices, and matches the network address from the update bearer request to the list of network address. Alternatively, the serving gateway 150 may lookup the tracking area indicated in the update bearer response against a list of tracking areas serviced by micro base stations. Additionally, the serving gateway 150 may store a list of physical locations of micro base stations and provide a physical location of the micro base station in the first location notification, as well as an indication that the mobile device is communicating through a micro base station.

In step 530, the serving gateway 150 receives a second update bearer request for the mobile device when the mobile device is communicating through a macro base station. The serving gateway 150 sends a second location notification to the location server in step 540. The second location notification includes an indication that the mobile device is no longer communicating through the micro base station, and is no longer near the physical location of the micro base station.

In one example, the serving gateway 150 may determine when a mobile device previously supported by an address (e.g., IP address or TEID) associated with a micro base station is now supported by an address that is not associated with a micro base station, indicating that the mobile device has left the coverage area of the micro base station. In this way, the serving gateway 150 supports walk-away detection by immediately signaling the location server with a location notification without waiting for a predetermined amount of time without any messages from the micro base station.

Figure 6:
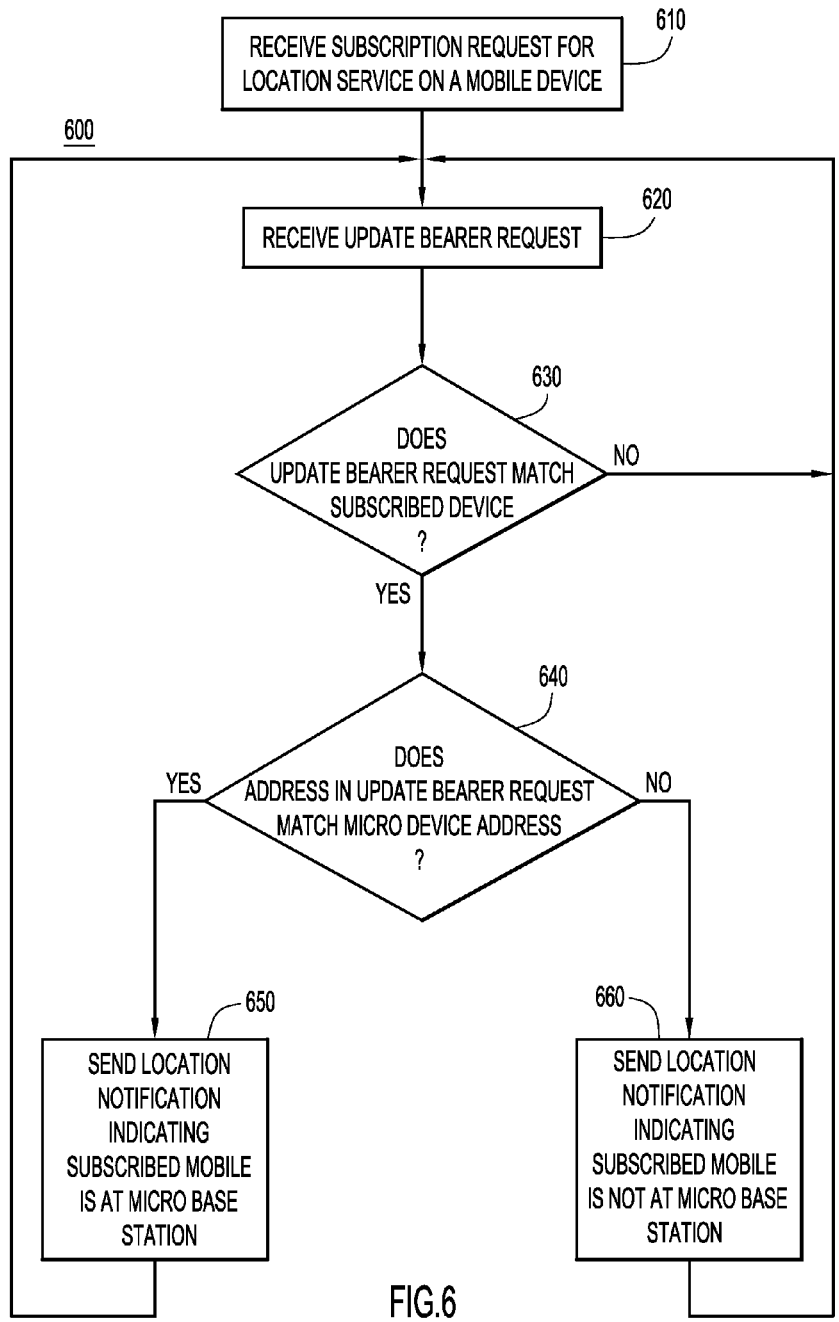
FIG. 6 is a flowchart showing operations performed by the serving gateway in matching mobile devices that are subscribed to a location service to update bearers with location information, according to an example embodiment.

Referring now to FIG. 6, a flowchart is shown of an example process 600 of the operations of the serving gateway 150 in providing a location service to subscribed mobile devices. In step 610, the serving gateway 150 receives a subscription request for a location service on a mobile device. The subscription request may be received from a location/presence server. The subscription request may identify the subscribed mobile device by a mobile identifier such as its IMSI. The subscription requests may be collected in a list of subscribed mobile devices.

In step 620, the serving gateway 150 receives an update bearer request that includes a mobile device identifier and an address corresponding to the base station through which the mobile device connects to the cellular network. In one example, the address may include an Internet Protocol (IP) address, a TEID address, or a tracking area code. In step 630, the serving gateway 150 compares the identifier of the mobile device to a list of subscribed mobile devices. If the mobile identifier in the update bearer request does not match to any entry in the list, then the process returns to wait for another update bearer request. If the mobile identifier in the update bearer request does match an entry in the list of subscribed devices, then the process 600 continues to determine which base station the mobile device is using to connect to the cellular network.

In step 640, the serving gateway 150 compares the address of the base station included in the update bearer request to a list of addresses corresponding to micro base stations. If the address matches an entry in the list of micro base stations, then the serving gateway 150 sends a location notification to a location/presence server indicating that the subscribed mobile device is at the micro base station in step 650. If the address in the update bearer request does not match any entry in the list of micro base stations, then the serving gateway 150 sends a location notification to the location/presence server indicating that the subscribed mobile device is not at a micro base station in step 660.

In summary, a serving gateway includes enhanced functionality to enable location and presence detection to be signaled in networks without relying on any modification to the Mobility Management Entity. The same serving gateway functionality may be used to deliver walk-away detection from a micro base station. The system is also able to support notification subscriptions for particular mobile devices on the appropriate serving gateway instances. These techniques do not require other vendor's mobility management entities to activate location and presence capability. In fact, these techniques can support multi-vendor serving gateways and may be appealing to a service provider than multiple vendor mobility management entities. Moreover, these techniques enable rapid walk away detection. Again, these techniques exploit the opportunity to deliver small (micro) cell walk away detection using the serving gateway as an element that has visibility to macro network signaling.

In one form, a computer-implemented method is provided for a serving gateway to update location information for a mobile device based on information in an update bearer request. The method comprises receiving a first update bearer request for a mobile device. The first update bearer request includes a first address associated with a micro cellular service base station to which the mobile device is in communication. The micro cellular service base station is associated with a physical location. The method further comprises sending a first location notification to a location server. The first location notification indicates that the mobile device is at the physical location associated with the micro cellular service base station. The serving gateway receives a second update bearer request for the mobile device. The second update bearer request includes a second address associated with a macro cellular service base station. The serving gateway sends a second location notification to the location server. The second location notification indicates that the mobile device is no longer at the physical location associated with the micro cellular service base station.

In another form, an apparatus is provided comprising a network interface unit and processor is provided for updating location information of a mobile device based on information in an update bearer request. The network interface unit is configured to communicate with computing devices on one or more networks. The processor is configured to receive via the network interface unit, a first update bearer request. The first update bearer request includes a first address associated with a micro cellular service base station to which the mobile device is in communication. The micro cellular service base station is associated with a physical location. The processor is also configured to send a first location notification to a location server via the network interface unit. The first location notification indicates that the mobile device is at the physical location associated with the micro cellular service base station. The processor is further configured to receive via the network interface unit, a second update bearer request for the mobile device. The second update bearer request includes a second address associated with a macro cellular service base station. The processor is configured to send a second location notification to the location server via the network interface unit. The second location notification indicates that the mobile device is not longer at the physical location associated with the micro cellular service base station.

In yet another form, one or more non-transitory computer readable storage media are provided with software comprising computer executable instructions operable to cause a processor to update location information of a mobile device based on information in an update bearer request. The instructions are configured to cause the processor to receive a first update bearer request. The first update bearer request includes a first address associated with a micro cellular service base station to which the mobile device is in communication. The micro cellular service base station is associated with a physical location. The instructions are also configured to cause the processor to send a first location notification to a location server. The first location notification indicates that the mobile device is at the physical location associated with the micro cellular service base station. The instructions are further configured to cause the processor to receive a second update bearer request for the mobile device. The second update bearer request includes a second address associated with a macro cellular service base station. The instructions are configured to cause the processor to send a second location notification to the location server via the network interface unit. The second location notification indicates that the mobile device is not longer at the physical location associated with the micro cellular service base station.

The above description is intended by way of example only. Various modifications and structural changes may be made therein without departing from the scope of the concepts described herein and within the scope and range of equivalents of the claims.

What is claimed is:

1. A method comprising:
receiving a first update bearer request for a mobile device, the first update bearer request including a first address associated with a micro cellular service base station to which the mobile device is in communication, wherein the micro cellular service base station is associated with a physical location;
sending a first location notification to a location server, the first location notification indicating that the mobile device is at the physical location associated with the micro cellular service base station;
receiving a second update bearer request for the mobile device, the second update bearer request including a mobile identifier and a second address associated with a macro cellular service base station;
matching the mobile identifier to a list of mobile identifiers corresponding to mobile devices that have subscribed to a location service; and
sending a second location notification to the location server, the second location notification indicating that the mobile device is no longer at the physical location associated with the micro cellular service base station.

2. The method of claim 1, further comprising:
receiving a location subscription from the location server, the location subscription identifying the mobile device and requesting notifications of the location of the mobile device.

3. The method of claim 1, wherein the first update bearer request and the second update bearer request each include an International Mobile Subscriber Identity (IMSI) as the mobile identifier to identify the mobile device.

4. The method of claim 3, further comprising matching the IMSI in the second update bearer request to a list of IMSIs corresponding to mobile devices that have subscribed to the location service.

5. The method of claim 1, wherein the first update bearer request includes a first tracking area code to identify the micro cellular service base station and the second update bearer request includes a second tracking area code to identify the macro cellular service base station.

6. The method of claim 5, wherein the first address associated with the micro cellular service base station comprises an address of a Home Evolved Node B (HeNB) gateway.

7. The method of claim 1, wherein the first address and the second address each comprises an Internet Protocol (IP) address or a Tunnel Endpoint Identifier (TED).

8. The method of claim 1, wherein the second update bearer request comprises a request to modify bearer resources associated with the mobile device or a request to release the bearer resources associated with the mobile device.

9. An apparatus comprising:
a network interface unit configured to communicate with computing devices on one or more networks; and
a processor configured to:
receive via the network interface unit, a first update bearer request for a mobile device, the first update bearer request including a first address associated with a micro cellular service base station to which the mobile device is in communication, wherein the micro cellular service base station is associated with a physical location;
send a first location notification to a location server via the network interface unit, the first location notification indicating that the mobile device is at the physical location associated with the micro cellular service base station;
receive via the network interface unit, a second update bearer request for the mobile device, the second update bearer request including a mobile identifier and a second address associated with a macro cellular service base station;
match the mobile identifier to a list of mobile identifiers corresponding to mobile devices that have subscribed to a location service; and
send a second location notification to the location server via the network interface unit, the second location notification indicating that the mobile device is no longer at the physical location associated with the micro cellular service base station.

10. The apparatus of claim 9, wherein the processor is further configured to receive via the network interface unit, a location subscription from the location server, the location subscription identifying the mobile device and requesting notifications of the location of the mobile device.

11. The apparatus of claim 9, wherein the first update bearer request and the second update bearer request each include an International Mobile Subscriber Identity (IMSI) as the mobile identifier to identify the mobile device.

12. The apparatus of claim 11, wherein the processor is further configured to match the IMSI in the second update bearer request to a list of IMSIs corresponding to mobile devices that have subscribed to the location service.

13. The apparatus of claim 9, wherein the first update bearer request includes a first tracking area code to identify the micro cellular service base station and the second update bearer request includes a second tracking area code to identify the macro cellular service base station.

14. The apparatus of claim 13, wherein the first address associated with the micro cellular service base station comprises an address of a Home Evolved Node B (HeNB) gateway.

15. One or more non-transitory computer readable storage media encoded with software comprising computer executable instructions and when the software is executed operable to cause a processor to:
receive a first update bearer request for a mobile device, the first update bearer request including a first address associated with a micro cellular service base station to which the mobile device is in communication, wherein the micro cellular service base station is associated with a physical location;
send a first location notification to a location server, the first location notification indicating that the mobile device is at the physical location associated with the micro cellular service base station;
receive a second update bearer request for the mobile device, the second update bearer request including a mobile identifier and a second address associated with a macro cellular service base station;

match the mobile identifier to a list of mobile identifiers corresponding to mobile devices that have subscribed to a location service; and send a second location notification to the location server, the second location notification indicating that the mobile device is no longer at the physical location associated with the micro cellular service base station.

16. The computer readable storage media of claim 15, further comprising instructions operable to cause the processor to receive via the network interface unit, a location subscription from the location server, the location subscription identifying the mobile device and requesting notifications of the location of the mobile device.

17. The computer readable storage media of claim 15, wherein the first update bearer request and the second update bearer request each include an International Mobile Subscriber Identity (IMSI) as the mobile identifier to identify the mobile device.

18. The computer readable storage media of claim 17, further comprising instructions operable to cause the processor to match the IMSI in the second update bearer request to a list of IMSIs corresponding to mobile devices that have subscribed to the location service.

19. The computer readable storage media of claim 15, wherein the first update bearer request includes a first tracking area code to identify the micro cellular service base station and the second update bearer request includes a second tracking area code to identify the macro cellular service base station.

20. The computer readable storage media of claim 19, wherein the first address associated with the micro cellular service base station comprises an address of a Home Evolved Node B (HeNB) gateway.

* * * * *